US007239860B2

(12) United States Patent
Stoks

(10) Patent No.: US 7,239,860 B2
(45) Date of Patent: Jul. 3, 2007

(54) METHOD AND APPARATUS FOR GENERATING AN ALERT MESSAGE

(75) Inventor: Franciscus G Stoks, Lower Hutt (NZ)

(73) Assignee: Fulcit New Zealand Limited, a New Zealand Company of Hercus King & Company, Wellington (NZ)

( * ) Notice: Subject to any disclaimer, the term of this patent is extended or adjusted under 35 U.S.C. 154(b) by 610 days.

(21) Appl. No.: 10/415,129

(22) PCT Filed: Oct. 26, 2001

(86) PCT No.: PCT/NZ01/00237

§ 371 (c)(1),
(2), (4) Date: Apr. 25, 2003

(87) PCT Pub. No.: WO02/35491

PCT Pub. Date: May 2, 2002

(65) Prior Publication Data

US 2004/0038664 A1 Feb. 26, 2004

(30) Foreign Application Priority Data

Oct. 27, 2000 (NZ) ..................................... 507837

(51) Int. Cl.
*H04M 11/00* (2006.01)
*H04Q 7/20* (2006.01)

(52) U.S. Cl. ............................... 455/404.1; 455/404.2; 455/456.1; 455/458

(58) Field of Classification Search ............. 455/404.1, 455/404.2, 414.1, 414.2, 414.3, 432.3, 440, 455/456.1–456.3
See application file for complete search history.

(56) References Cited

U.S. PATENT DOCUMENTS

| | | | |
|---|---|---|---|
| 3,883,695 | A | 5/1975 | Bickel et al. |
| 4,371,751 | A | 2/1983 | Hilligoss, Jr. et al. |
| 4,524,243 | A | 6/1985 | Shapiro |
| 4,547,778 | A | 10/1985 | Hinkle et al. |
| 4,760,593 | A | 7/1988 | Shapiro et al. |
| 5,043,720 | A | 8/1991 | Laurienzo |
| 5,193,215 | A | 3/1993 | Olmer |

(Continued)

FOREIGN PATENT DOCUMENTS

| | | | |
|---|---|---|---|
| EP | 0 897 119 | A2 | 2/1999 |

*Primary Examiner*—Benny Q. Tieu
(74) *Attorney, Agent, or Firm*—Pillsbury Winthrop Shaw Pittman, LLP

(57) ABSTRACT

A method of generating an alert message, the method including the steps of: a) inputting a location identifier into a communication unit; b) transmitting the location identifier from the communication unit to a central monitoring station; c) receiving the location identifier at the central monitoring station; d) retrieving information associated with the received location identifier from a database; and e) outputting an alert message which varies in accordance with the retrieved information. And also a method of generating an alert message including the steps of: a) storing one or more schedule records, each schedule record including a time range and associated schedule information; b) receiving a duress message from a remote communication unit; c) determining a receipt time of the duress message; d) selecting a schedule record having a time range which incorporates the receipt time; e) retrieving the schedule information from the selected schedule record; and f) outputting an alert message which varies in accordance with the retrieved schedule information.

11 Claims, 1 Drawing Sheet

U.S. PATENT DOCUMENTS

| | | | | |
|---|---|---|---|---|
| 5,235,320 | A | 8/1993 | Romano | |
| 5,309,506 | A | 5/1994 | Alexander | |
| 5,333,173 | A | 7/1994 | Seazholtz et al. | |
| 5,334,974 | A | 8/1994 | Simms et al. | |
| 5,523,762 | A | 6/1996 | Streetman | |
| 5,635,923 | A * | 6/1997 | Steele et al. | 340/905 |
| 5,714,931 | A | 2/1998 | Petite et al. | |
| 5,815,802 | A * | 9/1998 | Loechner, II | 455/414.1 |
| 5,982,281 | A | 11/1999 | Layson, Jr. | |
| 6,054,928 | A | 4/2000 | Lemelson et al. | |
| 6,185,426 | B1 | 2/2001 | Alperovich et al. | |
| 6,233,445 | B1 | 5/2001 | Boltz et al. | |
| 6,243,442 | B1 | 6/2001 | Tanaka et al. | |
| 6,255,945 | B1 | 7/2001 | Britton | |
| 6,263,050 | B1 | 7/2001 | Akhteruzzaman et al. | |
| 6,603,977 | B1 * | 8/2003 | Walsh et al. | 379/45 |
| 6,647,267 | B1 * | 11/2003 | Britt et al. | 455/404.2 |
| 2001/0034223 | A1 * | 10/2001 | Rieser et al. | 455/404 |
| 2001/0051514 | A1 * | 12/2001 | Lindholm | 455/404 |

* cited by examiner

METHOD AND APPARATUS FOR GENERATING AN ALERT MESSAGE

This application is the National Phase of International Application PCT/NZ01/00237 filed Oct. 26, 2001 which designated the U.S. and that International Application was published under PCT Article 21(2) in English.

The present invention relates to a method and apparatus for generating an alert message.

Personnel in the services and enforcement sectors (for example government field workers such as customs, housing or social services personnel, police officers, energy company meter readers, sex industry workers etc.) and other lone workers may visit potentially threatening or risky customers in the field. These people need the knowledge of others as to their exact whereabouts, to ensure they can receive help when their personal safety is under threat. They may also require information relating to the customers and/or relating to the property being visited.

The employer's obligations for lone workers under occupational safety and health legislation require them to provide all practical protection for these people, irrespective of where they work.

One method of calling for assistance would be for the user to dial up a central monitoring station using a cellular phone, and notify the central monitoring station of their current address. One problem with this method is that it is time consuming. Another problem is that if the person does not speak clearly, or if the connection is bad, then emergency communication may not be possible.

Another method can be envisaged in which the user carries a Global Positioning System (GPS) unit which transmits the GPS position of the user to a central monitoring location. This solution suffers from a number of problems. First, GPS may not pinpoint location with sufficient accuracy to give the exact location if the user is in a complex environment such as a multi-unit dwelling or car parking building. Second, conventional GPS units can be bulky, heavy and difficult to use. Third, the cost of GPS units can be high. Fourth, reliance on a GPS-based alarm system tends to minimize the requirement of the user to personally take responsibility for all aspects of their safety and security.

An object of the invention is to address the problems described above, or at least to provide the public with a useful choice.

A first aspect of the invention provides a method of generating an alert message, the method including the steps of:

a) receiving a location identifier from a user input device of a communication unit;

b) transmitting the location identifier from the communication unit to a central monitoring station;

c) receiving the location identifier at the central monitoring station, d) retrieving information associated with the received location identifier from a database; and e) outputting an alert message which varies in accordance with the retrieved information.

The first aspect of the invention also extends to apparatus for generating an alert message, the apparatus including:

a communication unit including an input device for receiving a location identifier, and a transmitter for transmitting the location identifier; and a receiver for receiving the location identifier; means for retrieving information associated with the received location identifier from a database; and means for outputting an alert message which varies in accordance with the retrieved information.

The use of a location identifier enables the location of the user to be transmitted quickly from the communication unit with less chance of error or failure. Information associated with the identifier can then be retrieved to generate the alert message.

It will be understood that the term 'alert message' is to be construed broadly, since the message may perform a variety of functions. For instance, in an emergency situation, the alert message may notify a response unit (for example a police station or security firm) that help is required, enabling personnel to be dispatched to a physical location described (for example by way of a street address) in the alert message. Alternatively, the alert message may be transmitted to the communication unit, and for instance may describe information such as threats or hazards associated with the location.

The alert message may include all or part of the retrieved information, or may be generated from the retrieved information in accordance with a predetermined algorithm.

The location identifier may be input into the unit by speaking into a microphone. However, preferably the location identifier is entered by actuating one or more keys or other input devices.

At its most basic level, the first aspect of the present invention may be implemented in a system in which a user only inputs the location identifier into the unit, and a central monitoring station immediately and automatically generates the alert message in response to receipt of the location identifier. However, preferably the alert message is only generated when certain conditions are met. In one example the method further comprises the step of receiving a duress message, wherein steps d) and e) are performed in response to receipt of the duress message. Typically the location identifier is input by a user before arriving at the location associated with the location identifier, and the duress message is only input by the user if assistance is required during the visit.

The duress message typically includes a source identifier which identifies the source of the duress message. This source identifier may uniquely identify the communication unit (for example a mobile phone) which transmitted the duress message, and/or may be a user ID identifying a particular user.

The duress message may be input by speaking into a microphone. However, this has the disadvantage of alerting any other persons present. Therefore preferably the duress message is input by actuating one or more keys or other input devices. Preferably the duress message is input by pressing only a single key.

Alternatively the alert message may be generated at a predetermined time. For example the alert message may be generated after a default period which is the same in all circumstances. Alternatively the time may be set by a user. In this case the method further comprises the steps of receiving a time period from a remote communication unit; and generating the alert message in response to the expiry of the received time period.

The communication unit may be a fixed unit connected to a landline—such as a conventional telephone. A problem with this is that the user must be able to find and use a telephone. Therefore preferably the communication unit for inputting and transmitting the location identifier, duress message and/or time period is a mobile unit which transmits via a wireless link. For example the mobile unit may be a cellular telephone, radio telephone, two-way pager or a hybrid device with 'mobile phone' functionality, for example a Personal Digital Assistant (such as a Palm Pilot™) with integrated mobile wireless capabilities.

The communication unit may communicate with the central monitoring station using a freephone 0800 phone number.

Different communication units may be used for inputting and transmitting the location identifier, duress message and/or time period. However preferably the same unit (preferably a mobile unit) is used for all applicable steps of the method.

The location information may be retrieved in step d) by inputting the received location identifier into a local database, or by forwarding the location identifier to a remote database.

The alert message may be transmitted to the remote communication unit and/or to a response unit.

A second aspect of the invention provides a method of generating an alert message including the steps of:

a) storing one or more schedule records, each schedule record including a time range and associated schedule information;
b) receiving a duress message from a remote communication unit;
c) determining a receipt time of the duress message;
d) selecting a schedule record having a time range which incorporates the receipt time;
e) retrieving the schedule information from the selected schedule record; and
f) outputting an alert message which varies in accordance with the retrieved schedule information.

The second aspect also extends to apparatus for generating an alert message, the apparatus including:

a) means for storing one or more schedule records, each schedule record including a time range and associated schedule information;
b) a receiver for receiving a duress message from a remote communication unit;
c) means for determining a receipt time of the duress message:
d) means for selecting a schedule record having a time range which incorporates the receipt time;
e) means for retrieving the schedule information from the selected schedule record; and
f) means for outputting an alert message which varies in accordance with the retrieved schedule information.

The second aspect of the invention relates to an alternative, time based, method and apparatus for generating an alert message, which may be used independently, or in conjunction with the first aspect of the invention.

Prior to making a visit, a user records the schedule information at a central monitoring unit. Then if a duress message is received during the specified time range, the associated schedule record can be located.

A third aspect of the invention provides a method of generating an alert message including the steps of:

a) storing two or more schedule records, each schedule record including a time indicator and associated schedule information, wherein at least two of the schedule records contain different time indicators and different schedule information:
b) retrieving schedule information from a schedule record at a time specified by its associated time indicator; and
c) outputting an alert message which varies in accordance with the retrieved schedule information, wherein steps b) and c) are performed at the specified time only if an OK message has not been received prior to the specified time.

The third aspect also extends to apparatus for generating an alert message including;

a) means for storing two or more schedule records, each schedule record including a time indicator and associated schedule information, wherein at least two of the schedule records contain different time indicators and different schedule information;
b) means for retrieving schedule information from a schedule record at a time specified by its associated time indicator; and
c) means for outputting an alert message which varies in accordance with the retrieved schedule information, wherein steps b) and c) are performed at the specified time only if an message has not been received prior to the specified time.

The third aspect of the invention relates to a further alternative, time based, method and apparatus for generating an alert message, which may be used independently, or in conjunction with the first and/or second aspects of the invention.

The alert message is output at the specified time only if an OK message has not been received.

The invention will now be described by way of example with reference to the accompanying drawings, in which.

Figure 1:
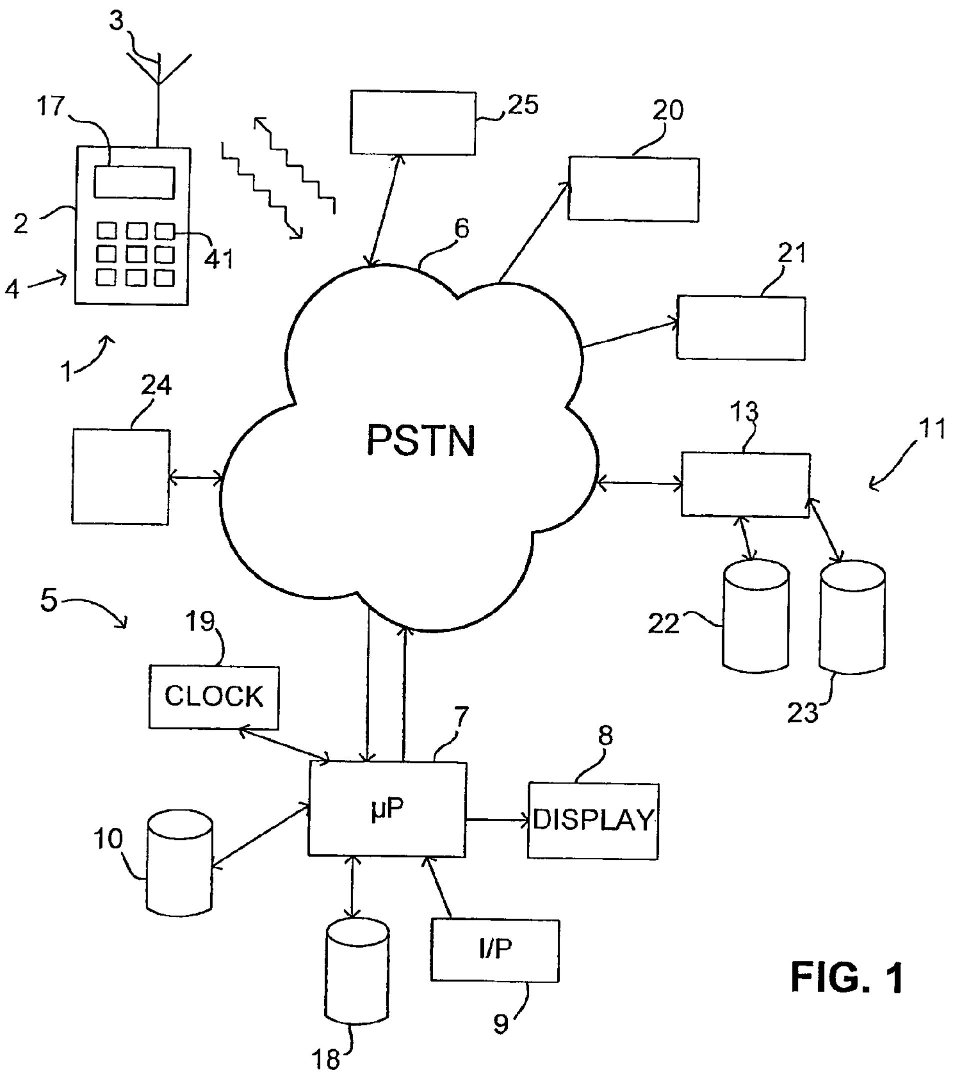
FIG. 1 is a schematic diagram of an emergency response system.

Referring to FIG. 1, a cellular phone 1 comprises a casing 2, antenna 3, keyboard 4 and display 17. The phone 1 communicates with a central monitoring station 5 via a communication medium 6 such as the Public Switched Telephone Network (PSTN) or internet using a cellular or Wireless Application Protocol (WAP) link.

The central monitoring station 5 comprises a processor 7 for sending and receiving signals to the communication medium 6, a display device 8, input device 9, warning message database 10 and registration database 18.

Figure 2:
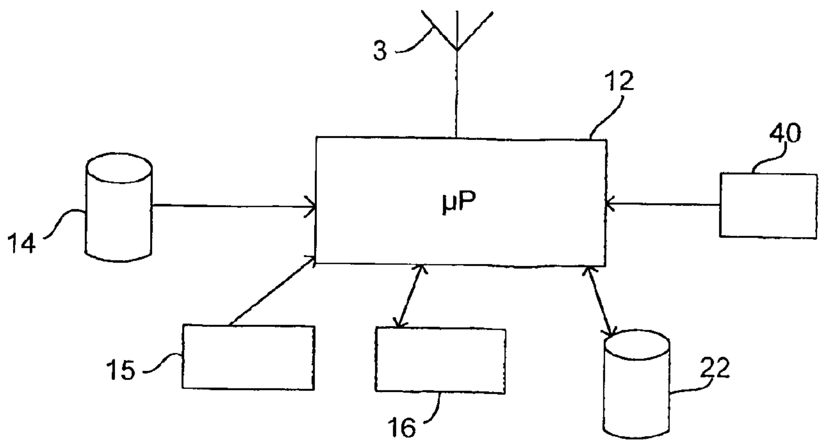
FIG. 2 is a schematic diagram of the cellular phone.

The electronics housed in the casing 2 of the phone 1 is shown in detail in FIG. 2. A processor 12 sends and receives signals to/from the antenna 3. The processor 12 is connected to a phone ID memory 14, keyboard controller 15, display controller 16 and microphone 40. The keyboard controller 15 controls the keyboard 4 and the display controller 16 controls the display of text on the display 17.

The phone 1 is carried by a user at all times, including times when the user is travelling and when visiting risky customers or locations. Before entering a property the user presses a pre-designated speed dial key 41 on keyboard 4 which automatically connects the phone 1 with the central monitoring station 5 (for example by dialing an 0800 phone number). Once connected, the user enters a location ID number which uniquely identifies the property/location they are about to visit. Optionally the user may also input a user ID which uniquely identifies the user.

The location ID number may be determined in a number of ways. For example the phone 1 may carry a store (not shown) with a list of addresses, along with their associated location ID's. Thus the user can determine the appropriate location ID by scrolling through the location ID's on display 17. Alternatively the location ID may be already known by the user. In the example described below, the location ID number is a case file number already known by the user.

The processor 12 retrieves a phone ID from memory 14. The phone ID uniquely identifies the phone 1 and is transmitted to the central monitoring station every time data is sent.

On receipt of the location ID, phone ID and user ID from the phone 1, the central processor retrieves a linked information record associated with the location ID in the manner described below.

The central monitoring station 5 provides a service to an entity 11 such as a government social services department. The department 11 (or another agency on its behalf) has a processor 13 which maintains a linked information record database 22 and a user database 23.

The linked information record database 22 contains a list of linked information records. Each linked information record contains a number of fields, such as:

a) location ID field
b) location descriptor field
c) client profile field
d) location profile field
e) business relationship profile field In more detail, the fields contain the following information:

a) The location ID field contains the location ID input by the user (for instance a case number).
b) The location descriptor field contains information describing the physical location of the location, such as:
   i) street address
   ii) apartment number
   iii) GPS coordinates.
c) The client profile field contains information associated with a particular individual or individuals, such as:
   i) known risky customer
      prior incident
      record of violence
      record of threats of violence
      firearms or other weapons
      mental or physical health
      subject to other stresses which nay contribute to risk (for example court proceedings etc)
      substance abuse
   ii) known risky associates, or other occupants (this field can include the information listed under item c)i) above)
   iii) dogs
d) The location profile field contains information associated with a particular physical location, for example:
   i) prior duress messages received from this property
   ii) risky access or means of access to property
   iii) risky neighbours
   iv) unsafe location, for example
      unsafe premises (for example with no alternative escape route)
      unsafe neighbourhood
e) The business relationship profile field contains information pertaining to the business relationship associated with a particular individual or individuals, such as:
   i) resolution proceedings initiated, such as:
      eviction notice
      debt collection
      repossession
      serving of legal proceedings
   ii) non-conformance with agreed business terms, such as:
      payment terms
      conditions of lease
      entitlement to benefit or compensation, etc.

The user database 23 contains a list of user records. Each user record has four fields:

a) user ID (the ID input by the user into the phone to identify himself)
b) user name
c) phone ID
d) other user information (for instance sex, ethnicity, disabilities etc)

The databases 22,23 may be encrypted for privacy purposes.

The central monitoring station 5 forwards the received location ID, user ID and phone ID to the processor 13. The processor 13 then retrieves the associated linked information record from database 22 and returns the record to the central monitoring station 5. The processor 13 also retrieves the user record associated with the phone ID and/or user ID and returns it to the central monitoring station 5. Alternatively the central monitoring station 5 may maintain local databases identical to databases 22,23 which are kept current by way of regular updates from the processor 13.

The retrieved linked information record and user record are saved as a single registration record in a registration store 18. The store 18 may be encrypted (or otherwise protected for example by a third party custodian) for privacy purposes.

The linked information record may be automatically transmitted to the phone 1 as a warning alert message for text display to warn the user of any potential hazards before they enter the property. Alternatively, only a selected part of the linked information record (for instance fields c)-e)) may be transmitted. In a further alternative, the processor 7 may carry out a predetermined algorithm on the linked information record to determine whether the location is particularly hazardous, and only transmit a warning message if the location is particularly hazardous. The algorithm may incorporate the user record—for instance a warning message may be transmitted for a particular property only if the user is a novice or inexperienced worker, or vulnerable in some other way. The warning alert message may simply constitute all or part of the linked information record. Alternatively the warning alert message may be generated by the algorithm (for instance the warning message may be "no lone female worker to enter this property").

The user also enters a number representing the time period in minutes after which they should have safely cleared the location. A clock 19 is set with the received time period and counts down until the time period expires. If no time is entered then a default time period is used.

The user enters the property leaving the phone on end conducts their business. If the business goes without incident, the user, upon departing, transmits an OK message by pressing the speed dial key 41 to connect with the central monitoring station 5, end automatically clears from the location just visited (i.e. the registration record is cleared from the registration store 18). The automatic clearing may be achieved by means of a numeric string in the memory or by pressing the zero key.

If the user encounters a threatening or risky situation from which they believe they may not be able to safely remove themselves, they press any of the keys of the keyboard 4 for a defined period corresponding to a deliberate action (for instance two seconds). The defined period is programmed into-the phone to guard against accidental operation. Alternatively the user may press some other unique, easily found key so designed by the phone manufacturer or provided by an after market accessory or service provider. If the key is held for the defined period, then a duress message is transmitted along with the phone ID. If the phone happens to be switched off, the user presses a designated key or keys for the defined period which will activate the phone and automatically transmit a duress message. With some training, the user should be able to operate the phone in a handbag, pocket or belt clip without alerting an aggressor.

Pressing a single button in order to transmit a duress message in an emergency is unlikely to antagonise an aggressor if the user does so under the pretext of turning the phone off.

When the processor 7 receives a duress message, the processor inputs the phone ID into database 18 to retrieve the associated registration record, and initiates the following emergency response routine.

The processor 7 first generates and displays an alert message which is displayed on display 8 for viewing by a monitoring station operator. The alert message includes selected information from the retrieved registration record, such as the address and user name. The processor 7 also immediately sends a text message to the phone 1 associated with the received phone ID, i.e. something like "press 1 for help, press 5 for re-call in five minutes, press 0 if OK". If the user presses 1, or if the phone is not answered, then the processor 7 immediately transmits the registration record to a response agency such as a security firm 20 or the police 21 via the PSTN 6. Means may be provided to enable the processor 7 to choose between a number of different response agencies, for instance to choose-the agency nearest to the registered address.

The processor 7 also updates field d)i) of the linked information record in database 22 to indicate that a duress message has been received from that location.

If the user gets into difficulty and is unable to use the phone (for instance if the battery is flat, the aggressor is aggravated, the phone is taken away, or use of the phone would put the user further at risk) then the system has a failsafe. When the timer period being counted down by clock 19 expires, the processor 7 automatically initiates the emergency response routine described above.

If the user finds that they are likely to exceed the estimated time on the premises, they can prevent the emergency response routine being initiated by redialing the monitoring station 5 and entering a further time period. This causes the clock 19 to be reset with the new time period. Alternatively, if the phone 1 is unable to make a connection, the user may call the central monitoring station from a fixed landline phone 24 and talk to an operator who resets the clock 19, or clears the user's data from the registration store.

In an alternative method, the user creates a schedule on PC 25. The schedule comprises one or more schedule records, each schedule record having five fields:

a) linked information field—this contains all of the information associated with a single linked information record (described above)

b) user ID c) user name d) phone ID e) time period—for example 1200–1300, Thursday 26 Oct. 2000

The schedule is transmitted to the central monitoring station and stored in registration store 18. If a duress message is received from the phone ID recorded in field d) between 1200 and 1300, then the emergency response routine is initiated. Alternatively, if the user does not transmit an OK message from the location by 1300 then the emergency response routine is initiated.

In an alternative system (not illustrated), GPS processing may also be provided. That is, the cellular phone 1 may have a GPS antenna and GPS processor for determining the location of the cellular phone based on GPS satellite signals. The GPS position of the phone is transmitted to the central monitoring system 5 along with the location ID and/or the duress message. The GPS position can then be sent with the alert message to the response agency 20 or 21 to enable the user to be found more easily, and also to act as a cross-check in case the user has moved from the previously registered address.

In a further alternative, in addition to creating a schedule, the user may download from database 22 into phone 1 the linked information records associated with all of the locations that they plan to visit in the next period (for instance that day or that week). The user can then access this data to establish the risk information for proposed client visits without recourse to the central database visit-by visit, while retaining the remaining functionality of the visit tracking and emergency/alert system.

Where in the foregoing description reference has been made to integers or components having known equivalents then such equivalents are herein incorporated as if individually set forth.

Although this invention has been described by way of example it is to be appreciated that improvements and/or modifications may be made thereto without departing from the scope or spirit of the present invention.

The invention claimed is:

1. A method of generating an alert message, the method including the steps of:

a) receiving a location identifier from a user input device of a communication unit;

b) transmitting the location identifier from the communication unit to a central monitoring station;

c) receiving the location identifier at the central monitoring station;

d) retrieving information associated with the received location identifier from a database; and e) outputting an alert message which varies in accordance with the retrieved information.

2. A method according to claim 1 wherein the retrieved information is descriptive of a physical location.

3. A method according to claim 1 wherein the retrieved information is descriptive of a potential threat or hazard.

4. A method according to claim 1 wherein the step of outputting an alert message includes the step of transmitting the alert message to the communication unit.

5. A method according to claim 1 wherein the step of outputting an alert message includes the step of transmitting the message to a response unit.

6. A method according to claim 1 further including the step of receiving a duress message, wherein steps d) and e) are performed in response to receipt of the duress message.

7. A method according to claim 6 wherein the duress message includes a source identifier which identifies the source of the duress message.

8. A method according to claim 1 wherein steps d) and e) are performed at a predetermined time.

9. A method according to claim 8 wherein steps d) and e) are performed in response to the expiry of a predetermined time period.

10. A method according to claim 9 wherein steps d) and e) are performed at the predetermined time only if an OK message has not been received prior to the predetermined time.

11. Apparatus for generating an alert message, the apparatus including:

a communication unit including an input device for receiving a location identifier, and a transmitter for transmitting the location identifier; and a receiver for receiving the location identifier; means for retrieving information associated with the received location identifier from a database; and means for outputting an alert message which varies in accordance with the retrieved information.

* * * * *